United States Patent
Braun et al.

(10) Patent No.: US 11,862,829 B2
(45) Date of Patent: Jan. 2, 2024

(54) METHOD AND CIRCUIT ARRANGEMENT FOR SETTING AN OPERATING STRATEGY FOR A FUEL CELL SYSTEM

(71) Applicant: Robert Bosch GmbH, Stuttgart (DE)

(72) Inventors: Jochen Braun, Heimsheim (DE); Sergei Hahn, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 17/425,758

(22) PCT Filed: Jan. 15, 2020

(86) PCT No.: PCT/EP2020/050899
§ 371 (c)(1),
(2) Date: Jul. 26, 2021

(87) PCT Pub. No.: WO2020/152006
PCT Pub. Date: Jul. 30, 2020

(65) Prior Publication Data
US 2022/0166042 A1 May 26, 2022

(30) Foreign Application Priority Data
Jan. 25, 2019 (DE) .................... 10 2019 200 949.2

(51) Int. Cl.
*H01M 8/04* (2016.01)
*H01M 8/04858* (2016.01)
(Continued)

(52) U.S. Cl.
CPC ......... *H01M 8/04925* (2013.01); *B60L 58/30* (2019.02); *H01M 8/043* (2016.02);
(Continued)

(58) Field of Classification Search
CPC ............. H01M 8/043; H01M 8/04574; H01M 8/04925; H01M 8/04992; H01M 2250/20
See application file for complete search history.

(56) References Cited

U.S. PATENT DOCUMENTS

| | | | |
|---|---|---|---|
| 8,952,649 B2 * | 2/2015 | Maier | H01M 8/04626 429/535 |
| 11,254,237 B2 * | 2/2022 | Braun | H01M 8/04201 |
| 2013/0335000 A1 | 12/2013 | Maier | |

FOREIGN PATENT DOCUMENTS

| | | |
|---|---|---|
| DE | 102013104324 A1 | 12/2013 |
| DE | 102017207477 A1 | 11/2018 |

(Continued)

OTHER PUBLICATIONS

Machine translation of DE 102017207477 (no date).*
Translation of International Search Report for Application No. PCT/EP2020/050899 dated Jun. 30, 2020 (3 pages).

*Primary Examiner* — Amanda C. Walke
(74) *Attorney, Agent, or Firm* — Michael Best & Friedrich LLP (57) ABSTRACT

The invention relates to a method for setting an operating strategy for a fuel cell system (2) of a power generation device (1), in particular in the form of a vehicle, depending on an operating mode of the power generation device (1), having the steps of: a determination unit (3) determining at least one current operating parameter (P1) of the power generation device (1), the determination unit (3) determining at least one cumulative and/or predictive operating parameter (P2, P3, P4) of the power generation device (1), and a setting device (8) setting the operating strategy for the fuel cell system (2) on the basis of the at least one current operating parameter (P1) and the at least one cumulative and/or predictive operating parameter (P2, P3, P4) of the power generation device (1). The invention furthermore (Continued)

relates to a corresponding circuit arrangement (10), to a computer program (20) and to a storage means with a computer program (20) stored thereon.

12 Claims, 2 Drawing Sheets

(51) Int. Cl.
*H01M 8/043* (2016.01)
*B60L 58/30* (2019.01)
*H01M 8/04537* (2016.01)
*H01M 8/04992* (2016.01)

(52) U.S. Cl.
CPC ... *H01M 8/04574* (2013.01); *H01M 8/04992* (2013.01); *H01M 2250/20* (2013.01)

(56) References Cited

FOREIGN PATENT DOCUMENTS

| | | | | |
|---|---|---|---|---|
| JP | 2004146075 | A | 5/2004 | |
| JP | 2007250199 | A | 9/2007 | |
| JP | 2007273302 | A | 10/2007 | |
| WO | 2008056617 | A1 | 5/2008 | |
| WO | WO-2020121499 | A1 * | 6/2020 | ............. B60L 50/75 |

* cited by examiner

METHOD AND CIRCUIT ARRANGEMENT FOR SETTING AN OPERATING STRATEGY FOR A FUEL CELL SYSTEM

BACKGROUND OF THE INVENTION

The present invention relates to a method and to a circuit arrangement for setting an operating strategy and/or operating mode for a fuel cell system of a power generation device, in particular with reference to a start/stop operation and/or a switch on/switch off operation of the power generation device in the form of a vehicle, on the basis of an operating mode of the power generation device. Moreover, the invention relates to a computer program, a memory medium with a computer program stored thereon, and to a circuit arrangement for appropriately setting the operating strategy.

In vehicles with drive systems that have a fuel cell system, the oxidizing agent oxygen from the ambient air is generally utilized in order to react with hydrogen in the fuel cell to form water and/or water vapor and, thereby, generate electric power via electrochemical conversion.

Start/stop operations, in which the ignition of the vehicle is on and/or the vehicle has not been completely switched off and/or an operational readiness of the vehicle has been initialized, and the manual switching off/on of the vehicle, in which the vehicle is at least essentially switched off and on, frequently represent a significant additional thermal, mechanical, physical, and/or chemical load for functional components in comparison to a continuous operation of the vehicle. The additional load can result in a corresponding reduction of the service life of the vehicle and its components.

SUMMARY OF THE INVENTION

Although the present invention relates, in particular, to a mobile fuel cell system and to an appropriate power generation device in the form of a vehicle, the approach according to the invention can also be applied in the area of stationary fuel cell systems, in which start/stop systems and/or a regular switching on and off of a fuel cell system are of relevance.

Within the scope of the present invention, a method according to claim 1 is provided, which at least partially takes the above-described problems into account. Moreover, a computer program, a memory medium, and a circuit arrangement are provided. Features and details, which are described in conjunction with the method, also apply, of course, in conjunction with the computer program according to the invention, the memory medium according to the invention, the circuit arrangement according to the invention, and vice versa in each case, so that, with respect to the disclosure, reference is always made and may always be made either way to the individual aspects of the invention.

According to a first aspect of the present invention, a method is provided for setting an operating strategy for a fuel cell system of a power generation device, in particular in the form of a vehicle, depending on an operating mode of the power generation device. The method includes the following steps:
  ascertaining at least one current operating parameter of the power generation device by means of an ascertainment unit,
  ascertaining at least one cumulative and/or predictive operating parameter of the power generation device by means of the ascertainment unit, and
  setting the operating strategy for the fuel cell system on the basis of the at least one current operating parameter and the at least one cumulative and/or predictive operating parameter of the power generation device by means of the setting device.

With the aid of the method according to the invention, an adaptive adjustment of the operating strategy and/or a switch between various operating strategies at and/or for a usage profile of the power generation device can be implemented currently, online, and throughout the service life of the power generation device on the basis of historical, current, and/or future data.

The operating strategy of the fuel cell system is set, in particular, depending on a start/stop operating mode, which is implemented by means of an automatic start/stop system, and/or a switch on/switch off operating mode of the power generation device. This means, the operating strategy of the fuel cell system can be set depending on a detected start/stop operation and/or a detected switch on/switch off operation of the power generation device. An operating strategy can be understood to be the manner in which the fuel cell system and/or the functional components of the fuel cell system will be or are controlled and/or regulated.

With the aid of the method according to the invention, the degradation and/or aging of various functional components of the fuel cell system can be minimized. In addition, the overall efficiency of the fuel cell system can be improved. Due to the operating mode of the fuel cell system, which is adaptable to the start/stop operation and/or the switch on/switch off operation of the power generation device, an overdimensioning of functional components of the fuel cell system can be prevented and/or a reduction of requirements for the functional components can be achieved. In addition, due to the method according to the invention, a flexible adaptation of the operating strategy to the driving situation and to the driver of a power generation device designed as a vehicle can be created. Actuators and/or functional components such as a hydrogen recirculation blower, a coolant pump, and/or control valves can be conserved.

The method according to the invention is utilized, in particular, for fuel cell systems that include actuators with gas bearings. The adaptation of the start/stop strategy is of particular relevance for this bearing variant, in order to be able to meet the necessary requirements for efficiency and service life.

Due to the method, unfavorable conditions during the start/stop operation and/or during the on/off operation of the power generation device for functional components and subsystems of the fuel cell system can be prevented or at least reduced in number.

A switched-on operating state of the power generation device is to be understood to be an operating state, in which the power generation device is in an active state. Preferably, an ignition is active and a power generation device designed as a vehicle is ready to go. As necessary, in this operating state, the fuel cell system can be automatically switched off or switched on again. A switched-off operating state of the power generation device can be understood to be an operating state, in which the power generation device is or has been manually switched off by a user. In this case, an ignition of the power generation device designed as a vehicle can no longer be switched on. If the power generation device is designed in the form of a vehicle, the vehicle in the switched-off operating state can be considered to have been shut down or at least to be ready to be shut down.

On the basis of the at least one current operating parameter and the at least one cumulative and/or predictive operating parameter, a variation and/or adaptation of a start/stop operating strategy can be carried out as a function of various operating parameters and/or boundary conditions. The possible variants are applicable, in particular, for manual switch-off processes carried out by a user as well as for automatic switch-off processes carried out by an automatic start/stop system of the power generation device.

A current operating parameter can be understood to be a temporarily current, directly tappable and/or measurable operating parameter and/or a parameter from a model-based calculation. An operating parameter of this type can also be understood to be a current power, which is calculated on the basis of ascertained voltage and current. The method is preferably continuously carried out. This means, as soon as the desired operating strategy has been set, the method and/or an appropriate routine is not terminated, but rather begins to run again, in particular after a predefinable time.

The vehicle is preferably designed in the form of a passenger car or a truck. Alternatively to a road vehicle, the vehicle can also be understood to be, however, an aircraft, a rail vehicle, a watercraft, or a robot.

A functional component can be, for example, a compressor of an air supply system of the fuel cell system for supplying air to a fuel cell stack, in particular to a cathode section of the fuel cell stack of the fuel cell system. Such compressors, despite their fundamental robustness, are capable of start/stop operation only to a limited extent due, in particular, to the gas bearings formed therein, since relatively high friction arises in the gas bearings during a start/stop operation and, thereby, the bearings are subject to increased degradation. A further example of a functional component of this type is the fuel cell stack, in which the cell voltages increase relatively sharply in the case of inadequate stack output and/or correspondingly small currents, as the result of which the degradation significantly increases. For this reason, with the aid of the present method, it can be ensured, for example, that the fuel cell stack may not be allowed to be operated below a predefinable power limit. If the air supply system has already completed several so-called friction starts, i.e., start/stop processes with rigid body friction in the gas bearing at a rotational speed below a lift-off rotational speed, the air supply system and/or the compressor can be completely switched off in as few cases as possible, i.e., preferably operated in idling mode. In the case of vehicles that are usually underway on long routes, switch-offs can also be carried out in city traffic, since the total number of start/stop processes overall is low. Further examples are described with reference to the associated dependent claims.

It is possible, according to one embodiment of the present invention, that the following are/is ascertained in a method as the at least one current operating parameter of the power generation device:
  current operating state of the power generation device,
  current vehicle speed of the power generation device in the form of a vehicle,
  current operating temperature of at least one system component of the power generation device,
  current state of charge, SOC, of a traction battery of the power generation device, and/or
  setpoint power of all electrical components of the power generation device.

With respect to the current operating state, it is ascertained, in particular, whether the power generation device has been or is manually switched on or switched off, i.e., whether an ignition of the power generation device is on or off. The current operating temperature can be ascertained, for example, of at least one fuel cell stack of the fuel cell system. The setpoint power of all electrical components of the power generation device can be understood to be a desired or necessary power in a vehicle electrical system of a power generation device designed as a vehicle.

Moreover, it is possible in a method according to the present invention that the following are/is ascertained as the at least one cumulative and/or predictive operating parameter of the power generation device:
  aging data of at least one functional component of the power generation device,
  number of switch on/switch off instances of the power generation device,
  frequency and/or duration of stop phases of the power generation device in the form of a vehicle,
  frequency and/or duration of shutoff phases of the power generation device in the form of a vehicle,
  average demand for drive power in the power generation device in the form of a vehicle,
  predictive operating parameters on the basis of navigation data of a navigation system of the power generation device (1) in the form of a vehicle, and/or
  predictive operating parameters on the basis of Car2X data of a Car2X receiver of the power generation device in the form of a vehicle.

In order to ascertain the aging data, for example, an operating hours counter can be evaluated in order to count operating hours of at least one of the functional components. Moreover, in order to ascertain the aging data, a model-based aging estimation and/or calculation can be utilized. The at least one predictive operating parameter can preferably be ascertained on the basis of cloud information. When Car2X data are utilized, for example, a prediction of the expected standstill time is possible when a vehicle is stopped at a traffic light, and so a decision regarding whether to switch off or continue operating the fuel cell system is possible.

In addition, in a method according to the invention, the power generation device can be designed in the form of a hybrid vehicle with a traction battery and the fuel cell system can include an air supply unit with a compressor for supplying air to a fuel cell stack of the fuel cell system, wherein the operating strategy of the fuel cell system is set in such a way that, when the automatic start/stop system of the hybrid vehicle has been activated, the fuel cell system, including the compressor, is switched off when
  it is detected during the ascertainment of the at least one current operating parameter of the hybrid vehicle that the required power in the hybrid vehicle is less than a minimum power of the fuel cell system, the ignition of the hybrid vehicle is on, and the state of charge of the traction battery, SOC, corresponds to a predefinable setpoint state, and
  it is detected during the ascertainment of the at least one cumulative and/or predictive operating parameter of the hybrid vehicle that it is established, over a predefinable period of time, less often than a predefinable number, that the required power in the hybrid vehicle is less than a minimum power of the fuel cell system.

This procedure can be utilized when, on the basis of an identified driver and detected or ascertained driving cycles, it is identified that few cases arise, in which the fuel cell power is not required. This can be the case for vehicles having frequent expressway travel or long-route travel. If, in addition, the state of charge of the traction battery is detected as being high or in the setpoint state, this method can be applied. The air supply unit can be understood to be an oxygen supply unit, by means of which oxygen or an oxygen-containing fluid such as air is fed to the fuel cell stack, in particular to a cathode section of the fuel cell stack. The expression that a state of charge corresponds to a setpoint state can be understood to mean that a charge value of the traction battery is above a predefinable threshold value or in a predefinable setpoint value range. The expression that it is established, over a predefinable period of time, less often than a predefinable number, that the required power in the hybrid vehicle is less than a minimum power of the fuel cell system can be understood to mean that a load profile or a characteristic value of at least one component that is aging-critical with respect to starting/stopping is less than a reference load profile or a reference characteristic value. This can be the case, for example, when the characteristic value in the form of a number of compressor starts is less than a reference characteristic value in the form of a reference number of compressor starts, in particular during a predefinable period of operation. This means, the load profile in this case can be a simple on/off number, at which an ACTUAL number is compared to a reference number. The load profile can be historically utilized up to a current point in time, although it can also take the future into account, in a forward-looking manner, via prediction.

In a method according to the present invention, it is also possible that the power generation device is designed in the form of a hybrid vehicle with a traction battery and the fuel cell system includes an air supply unit with a compressor for supplying air to a fuel cell stack of the fuel cell system, wherein the operating strategy of the fuel cell system is set in such a way that, when the automatic start/stop system of the hybrid vehicle is activated, the fuel cell system is switched off, with the exception of the compressor, which is subsequently operated further in idling mode for a predefinable period of time, when it is detected during the ascertainment of the at least one current operating parameter of the hybrid vehicle that the required power in the hybrid vehicle is less than a minimum power of the fuel cell system, the ignition of the hybrid vehicle is on, and the state of charge of the traction battery, SOC, corresponds to a predefinable setpoint state, and it is detected during the ascertainment of the at least one cumulative and/or predictive operating parameter of the hybrid vehicle that it is established, over a predefinable period of time, more often than a predefinable number, that the required power in the hybrid vehicle is less than a minimum power of the fuel cell system.

This method can be utilized when the fuel cell power is frequently not required, for example, due to frequent short routes or travel in traffic jams. In addition, this method can be applied when the state of charge of the traction battery is high or is in the setpoint state. As a result, the number of compressor shutoffs can be considerably reduced and the compressor can therefore be conserved. The expression that is it established, over a predefinable period of time, more often than a predefinable number, that the required power in the hybrid vehicle is less than a minimum power of the fuel cell system can be understood to mean that a load profile or a characteristic value of at least one component that is aging-critical with respect to starting/stopping is greater than a reference load profile or a reference characteristic value. This can be the case, for example, when the characteristic value in the form of a number of compressor starts is greater than a reference characteristic value in the form of a reference number of compressor starts, in particular during a predefinable period of operation. This means, the load profile in this case can be a simple on/off number, at which the ACTUAL number is compared to a reference number. The load profile can be historically utilized up to a current point in time, although it can also take the future into account, in a forward-looking manner, via prediction.

In addition, it is possible that, in a method according to the invention, the power generation device is designed in the form of a hybrid vehicle with a traction battery and the fuel cell system includes an air supply unit with a compressor for supplying air to a fuel cell stack of the fuel cell system, wherein the operating strategy of the fuel cell system is set in such a way that, when the automatic start/stop system of the hybrid vehicle has been activated, the fuel cell system can be continuously operated when it is detected during the ascertainment of the at least one current operating parameter of the hybrid vehicle that the required power in the hybrid vehicle is less than a minimum power of the fuel cell system, the ignition of the hybrid vehicle is on, and the state of charge of the traction battery, SOC, is less than a predefinable setpoint state, and it is detected during the ascertainment of the at least one cumulative and/or predictive operating parameter of the hybrid vehicle that it is established, over a predefinable period of time, more often than a predefinable number, that the required power in the hybrid vehicle is less than a minimum power of the fuel cell system.

This method variant can be utilized when the fuel cell power is regularly or currently not required. The fuel cell system can be operated at the best efficiency possible, wherein the traction battery can be charged. During the switched-off states of the fuel cell system, the vehicle can be driven electrically with the aid of the traction battery, provided the required drive power is very low. An application for a method of this type could be travel in a traffic jam or stop-and-go travel of the vehicle.

According to one further embodiment variant of the present invention, it is possible that, in a method, the power generation device is designed in the form of a hybrid vehicle with a traction battery and the fuel cell system includes an air supply unit with a compressor for supplying air to a fuel cell stack of the fuel cell system, wherein the operating strategy of the fuel cell system is set in such a way that the fuel cell system is continuously operated when it is determined during the ascertainment of the at least one current operating parameter of the hybrid vehicle that the required power in the hybrid vehicle is less than a predefinable threshold value and the ignition of the hybrid vehicle is on, at least for a predefineable period of time.

This method can be utilized when cases frequently occur, in which the fuel cell power is not required, such as, for example, during city driving, travel in a traffic jam, or on a short route. The expression that the fuel cell system is continuously operated means that the fuel cell system is not switched off. The predefinable threshold value can be understood to be a minimally permissible power of the fuel cell system. When the traction battery has reached a predefinable, in particular a maximum, state of charge and the fuel cell system still cannot be switched off or is to be continued to be continuously operated, additional consumers of the power generation device and/or of the fuel cell system can be switched on. Therefore, the required power is greater than the predefined threshold value. This means, the fuel cell system can also be continuously operated or not switched off when it is detected during the ascertainment of the at least one current operating parameter of the hybrid vehicle that the required power in the hybrid vehicle is greater than the predefinable threshold value or the minimally permissible power of the fuel cell system, and the ignition of the hybrid vehicle is on.

In addition, in a method according to the invention, the power generation device can be designed in the form of a hybrid vehicle with a traction battery and the fuel cell system can include an air supply unit with a compressor for supplying air to a fuel cell stack of the fuel cell system, wherein the operating strategy of the fuel cell system is set in such a way that the fuel cell system is continuously operated and the traction battery of the hybrid vehicle is charged until the state of charge, SOC, corresponds to a predefinable setpoint state when     it is detected during the ascertainment of the at least one current operating parameter of the hybrid vehicle that the required power in the hybrid vehicle is less than a minimum power of the fuel cell system, the ignition of the hybrid vehicle is on, and the state of charge of the traction battery, SOC, is less than a predefinable setpoint state, wherein, thereafter, an output power of the fuel cell system is reduced to a predefinable power value.

This routine is preferably utilized for the case in which the fuel cell power is regularly not required. If the state of charge of the traction battery is in a lower range and the power demand of the vehicle electrical system when the vehicle is at a standstill exceeds the minimum power of the fuel cell system, the fuel cell system can also never be switched off. Below the minimum power of the fuel cell system is to be understood to mean the smallest possible power value, with which the fuel cell system can be operated. The output power of the fuel cell system can be reduced by reducing a power generation and/or by connecting power consumers.

Embodiments for methods are described in the following, in which the power generation device is in a switched-off or manually switched-off operating state.

According to one embodiment, it is possible that the power generation device is designed in the form of a hybrid vehicle with a traction battery and the fuel cell system includes an air supply unit with a compressor for supplying air to a fuel cell stack of the fuel cell system, wherein the operating strategy of the fuel cell system is set in such a way that the fuel cell system, including the compressor, is switched off when     it is detected during the ascertainment of the at least one current operating parameter of the hybrid vehicle that the required requested fuel cell power is equal to zero and the hybrid vehicle has been manually switched off by the driver, and     it is detected during the ascertainment of the at least one cumulative operating parameter (P2, P3, P4) that shutdown times of the vehicle are longer than predefinable reference shutdown times.

This method can be applied, for example, in a commuter vehicle. A typical commuter vehicle is frequently utilized only for traveling back and forth to work and only occasionally for longer routes. In a case of this type, the vehicle shutdown phases are significantly long, usually considerably more than, for example, 15 minutes. In these vehicles or in vehicles having a driving behavior of this type, a strategy of this type can be advantageously utilized when the state of charge of the traction battery is above a necessary threshold. If the state of charge of the traction battery when the vehicle is shut down is below this threshold or is not in the predefinable setpoint state, a strategy, explained further below, can be utilized, according to which the battery is charged with a good efficiency of the fuel cell system. The ascertainment of the required fuel cell power is preferably carried out when the hybrid vehicle or the power generation device is switched off. Here, it can be ascertained whether the power request to the fuel cell system is equal to zero, or not.

Moreover, it is possible in a method according to the present invention that the power generation device is designed in the form of a hybrid vehicle with a traction battery and the fuel cell system includes an air supply unit with a compressor for supplying air to a fuel cell stack of the fuel cell system, wherein the operating strategy of the fuel cell system is set in such a way that the fuel cell system is switched off, with the exception of the compressor, which is operated further in idling mode for a predefinable period of time, when     it is detected during the ascertainment of the at least one current operating parameter of the hybrid vehicle that the required power in the hybrid vehicle is less than a minimum power of the fuel cell system, the hybrid vehicle has been manually switched off by the driver, and     it is detected during the ascertainment of the at least one cumulative and/or predictive operating parameter of the hybrid vehicle that a predefinable number of shutoff times of the hybrid vehicle was shorter than a setpoint time in each case over a predefinable period of time.

The procedure can be utilized, for example, in a delivery vehicle when the driver frequently shuts down the vehicle for a short period of time. With reference to the present invention, it is pointed out here that the fuel cell system does not necessarily need to be switched off or in a switched-off state when the hybrid vehicle is in a switched-off state or is switched off. The frequency and/or length of the shutoff times can be ascertained by means of a GPS system installed in the hybrid vehicle and/or an acceleration sensor of the hybrid vehicle. If a predefinable time value is exceeded without a driver of the hybrid vehicle having started the hybrid vehicle, the compressor can be switched off. The ascertainment of the required power is preferably carried out when the hybrid vehicle is switched off. Here, it can be ascertained whether the power request to the fuel cell system is equal to zero, or not.

Moreover, in a method according to the present invention, the power generation device can be designed in the form of a hybrid vehicle with a traction battery and the fuel cell system can include an air supply unit with a compressor for supplying air to a fuel cell stack of the fuel cell system, wherein the operating strategy of the fuel cell system is set in such a way that the fuel cell system is continued to be continuously operated for a predefinable period of time and, at least in this period of time, the traction battery is charged, and, thereafter, the fuel cell system, including the compressor, is switched off when     it is detected during the ascertainment of the at least one current operating parameter of the hybrid vehicle that the required power in the hybrid vehicle is less than a minimum power of the fuel cell system and the hybrid vehicle has been manually switched off by the driver, and     when the state of charge of the traction battery (4), SOC, is less than a predefinable setpoint state.

In this way as well, among other things, a favorable consumption can be achieved with infrequent switchings on and off of the fuel cell system. Alternatively to the charging of the traction battery, a sufficient and/or predeterminable number of consumers of the fuel cell system and/or of the power generation device can also be switched on, for example, for the post-processing and/or conditioning of the hybrid vehicle.

In a method according to the present invention, it is also possible that the power generation device is designed in the form of a hybrid vehicle with a traction battery and the fuel cell system includes an air supply unit with a compressor for supplying air to a fuel cell stack of the fuel cell system, wherein the operating strategy of the fuel cell system is set in such a way that the fuel cell system is continued to be continuously operated for a predefinable period of time, in which the traction battery is charged, until the state of charge of the traction battery corresponds to a predefinable setpoint state and, thereafter, is switched off, with the exception of the compressor, which is then continued to be operated in the idling mode for a predefinable time, when     it is detected during the ascertainment of the at least one current operating parameter of the hybrid vehicle that the required power in the hybrid vehicle is less than a minimum power of the fuel cell system and the hybrid vehicle has been manually switched off by the driver, and     it is detected during the ascertainment of the at least one cumulative operating parameter (P2, P3, P4) that shutdown times of the vehicle are shorter than predefinable reference shutdown times.

If it is detected that the vehicle shutdown times are short, which is the case, for example, in delivery traffic or a taxi operation, the fuel cell system can initially charge the traction battery. Thereafter, the compressor can continue to be operated in idling mode. The after-run time can be appropriately adapted to the vehicle shutdown times. If a time limit of the shutdown time is exceeded, the entire fuel cell system, including the compressor, is shut down using an appropriate procedure. Moreover, the state of charge, SOC, of the traction battery can be checked during the ascertainment of the at least one current operating parameter of the hybrid vehicle. This means, the state of charge can be utilized as a further parameter for setting the operating strategy being discussed here.

According to a further aspect of the present invention, a computer program is made available. The computer program includes commands, which, when the computer program is run by a computer, prompt the computer to carry out a method as described above. Therefore, the computer program according to the invention provides the same advantages that have been extensively described with reference to the method according to the invention. The computer program can be implemented as a computer-readable instruction code in any suitable programming language such as, for example, in JAVA, C++, or C#. The computer program can be stored on a computer-readable memory medium such as a data disk, a removable drive, a volatile or non-volatile memory, or a memory/processor. The instruction code can program a computer or other programmable devices such as a control unit, in particular a vehicle control unit, in such a way that the desired functions are carried out. Moreover, the computer program will be or can be provided in a network such as, for example, the Internet, from which it can be downloaded, as necessary, by a user. In this way, selected method steps can be carried out, for example, on a cloud server and subsequently implemented in the vehicle. The computer program will be or is implemented by means of a software as well as by means of one or multiple special electronic circuit(s), i.e., in hardware in the form of a computer program product, or in any hybrid form, i.e., by means of software components and hardware components. Within the scope of the present invention, in addition, a memory medium is provided with a computer program of this type, which is stored on the memory medium. The memory medium can be understood to be a control unit, in particular a vehicle control unit, in which the computer program for carrying out a method according to the invention is installed.

According to one further aspect, a circuit arrangement for setting an operating strategy for a fuel cell system of a power generation device, in particular in the form of a vehicle, is made available regardless of an operating mode of the power generation device according to a method as explained above. The circuit arrangement includes an ascertainment unit for ascertaining at least one current operating parameter of the power generation device and at least one cumulative and/or predictive operating parameter of the power generation device, and a setting unit for setting the operating strategy for the fuel cell system on the basis of the at least one current operating parameter and the at least one cumulative and/or predictive operating parameter of the power generation device. Therefore, the circuit arrangement according to the invention also provides the above-described advantages. The circuit arrangement can be provided by means of hardware components as well as by means of software components.

BRIEF DESCRIPTION OF THE DRAWINGS

Further measures which improve the invention result from the following description of various exemplary embodiments of the invention, which is schematically represented in the figures. All features and/or advantages, including design details and spatial arrangements, resulting from the claims, the description, or the drawing, can be essential to the invention alone or in highly diverse combinations.

Schematically.

DETAILED DESCRIPTION

Figure 1:
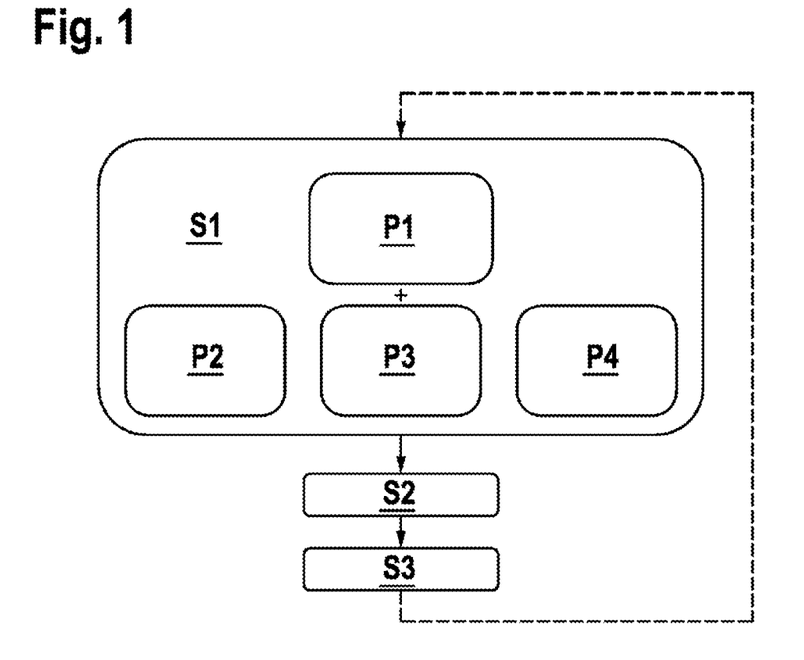
FIG. 1 shows a flowchart for explaining a method according to an embodiment of the present invention.
Figure 2:
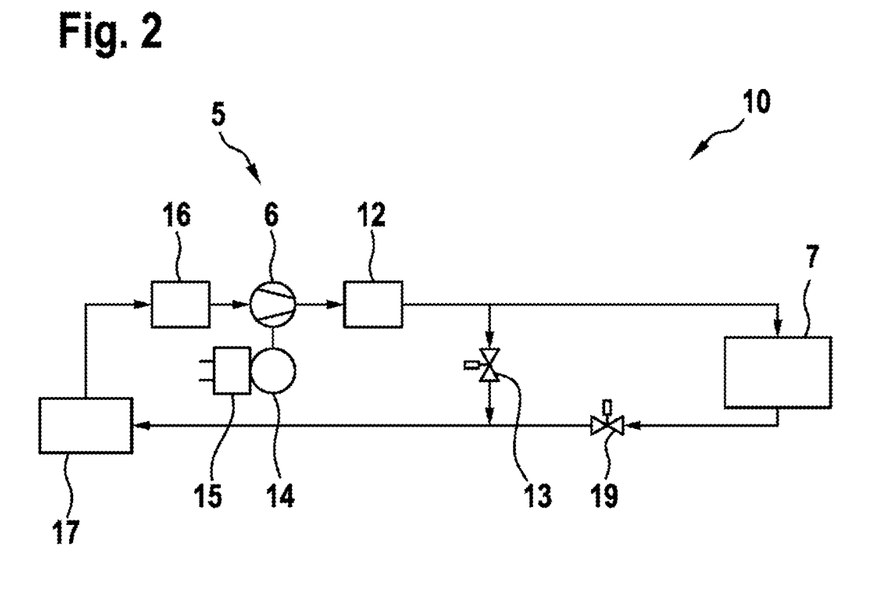
FIG. 2 shows a block diagram for explaining a circuit arrangement according to an embodiment of the present invention.
Figure 3:
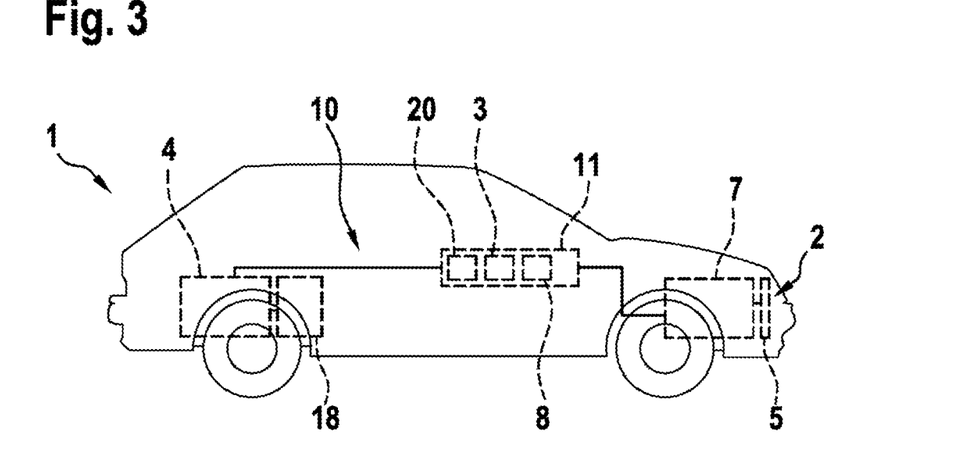
FIG. 3 shows a vehicle with a circuit arrangement according to the invention.

Elements having the same function and mode of operation are each provided with the same reference signs in FIGS. 1 through 3.

With reference to FIG. 1, a method is described for setting an operating strategy for a fuel cell system 2 of a power generation device 1 in the form of a hybrid vehicle depending on an operating mode of the hybrid vehicle. For this purpose, in a first step S1, at least one current operating parameter P1 of the hybrid vehicle is ascertained by means of an ascertainment unit 3. More precisely, a current operating state of the hybrid vehicle 1, a current vehicle speed of the hybrid vehicle, a current operating temperature of at least one system component of the hybrid vehicle, a current state of charge, SOC, of a traction battery 4 of the hybrid vehicle, and/or a desired power in the vehicle electrical system of the hybrid vehicle are/is ascertained as the at least one current operating parameter P1.

In addition, at least one cumulative and/or predictive operating parameter P2, P3, P4 of the hybrid vehicle is ascertained by means of the ascertainment unit 3. More precisely, information P2 regarding the aging state, such as, for example, aging data from at least one functional component of the hybrid vehicle or a number of switch on/switch off instances of the hybrid vehicle, information P3 regarding a driver or a driver profile of the driver of the hybrid vehicle, such as frequency and/or duration of stop phases of the hybrid vehicle, frequency and/or duration of shutdown phases of the hybrid vehicle in the form of a vehicle, or an average demand for drive power in the hybrid vehicle, and/or prediction data P4 such as navigation data of a navigation system of the hybrid vehicle, and/or Car2X data of a hybrid vehicle are ascertained as the at least one cumulative and/or predictive operating parameter P2, P3, P4 of the hybrid vehicle, and utilized as described above.

In a second step S2, thereafter, a suitable operating strategy can be ascertained for the fuel cell system 2 on the basis of the at least one current operating parameter P1 and the at least one cumulative and/or predictive operating parameter P2, P3, P4 of the power generation device. This can be carried out again by the ascertainment unit 3.

As soon as the suitable operating strategy has been ascertained, the ascertained operating strategy for the fuel cell system 2 can be set by a setting unit 8 in a third step S3. Subsequently, the method can start over in a predefinable way based on the operating parameters that are now present. The switch and/or adaptation of the operating strategy can take place from any variant to any other variant.

In FIG. 2, a specific part of a circuit arrangement 10 represented in FIG. 3 is represented in the form of a block diagram. As is apparent in FIG. 2, air from the surroundings 17 of the hybrid vehicle can be supplied, by means of an air supply unit 5 of the fuel cell system 2, to a fuel cell stack 7 and/or a cathode section of the fuel cell stack 7. The air supply unit 5 includes an air filter 16, a compressor 6, and an intercooler 12. Downstream from the intercooler a bypass line is formed with a bypass valve 13, via which the air can be directed past the cathode section when the fuel cell system 2 is switched off. Downstream from the fuel cell stack 7 and/or the cathode section of the fuel cell stack 7, a check valve 19 is arranged, which blocks for the case in which the bypass valve 13 is opened, in order to introduce an oxygen depletion into the cathode section. Moreover, the system represented in FIG. 2 includes an electric motor 14 and an associated inverter 15.

In FIG. 3, a power generation device 1 is represented in the form of a hybrid vehicle with a traction battery 4, a fuel cell system 2, and a fuel tank 18. The hybrid vehicle includes a circuit arrangement 10 for setting the operating strategy for the fuel cell system 2 of the hybrid vehicle depending on an operating mode of the hybrid vehicle. The hybrid vehicle further includes a control unit 11 with an ascertainment unit 3 and a setting unit 8. In addition, a computer program 20 for carrying out the above-described method is installed on the control unit 11.

In addition to the represented embodiments, the invention allows for further design principles. This means, the invention is not to be considered to be limited to the exemplary embodiments explained with reference to the figures. In particular, the method forms explained above in detail with reference to the dependent claims can be carried out within the scope of the flowchart represented in FIG. 1 and/or the corresponding method.

Moreover, it should be noted that, in a hybrid vehicle, usually a hydrogen recirculation blower as well as a coolant pump can be switched off during the switch-off of the hybrid vehicle in an end phase after an after-run procedure. Upon detection of short shutoff phases of the hybrid vehicle, for example, during delivery operation, at least these actuators can nevertheless continue to be operated.

The invention claimed is:

1. A method for setting an operating strategy for a fuel cell system (2) of a power generation device (1), depending on an operating mode of the power generation device (1), the method comprising steps of:
   ascertaining at least one current operating parameter (P1) of the power generation device (1) by means of an ascertainment unit (3),
   ascertaining at least one cumulative and/or predictive operating parameter (P2, P3, P4) of the power generation device (1) by means of the ascertainment unit (3), and
   setting the operating strategy for the fuel cell system (2) on the basis of the at least one current operating parameter (P1) and the at least one cumulative and/or predictive operating parameter (P2, P3, P4) of the power generation device (1) by means of the setting device (8), wherein
   the operating strategy of the fuel cell system (2) is set in such a way that, when an automatic start/stop system of the hybrid vehicle has been activated, the fuel cell system (2), including the compressor (5), is switched off when:
   it is detected during the ascertainment of the at least one cumulative and/or predictive operating parameter (P2, P3, P4) of the hybrid vehicle that it is established, over a predefinable period of time, less often than a predefinable number, that the required power in the hybrid vehicle is less than a minimum power of the fuel cell system (2).

2. The method as claimed in claim 1, wherein the following is/are ascertained at the at least one current operating parameter (P1) of the power generation device (1):
   current operating state of the power generation device (1),
   current vehicle speed of the power generation device (1) in the form of a vehicle,
   current operating temperature of at least one system component of the power generation device (1),
   current state of charge, SOC, of a traction battery (4) of the power generation device (1), and/or
   setpoint power of all electrical components of the power generation device (1).

3. The method as claimed in claim 1, wherein the following is/are ascertained at the at least one cumulative and/or predictive operating parameter (P2, P3, P4) of the power generation device (1):
   aging data of at least one functional component of the power generation device,
   number of switch on/switch off instances of the power generation device (1),
   frequency and/or duration of stop phases of the power generation device (1) in the form of a vehicle,
   frequency and/or duration of shutoff phases of the power generation device (1) in the form of a vehicle,
   average demand for drive power in the power generation device (1) in the form of a vehicle,
   predictive operating parameters (P4) on the basis of navigation data of a navigation system of the power generation device (1) in the form of a vehicle, and/or
   predictive operating parameters (P4) on the basis of Car2X data of a Car2X receiver of the power generation device (1) in the form of a vehicle.

4. The method as claimed in claim 1, wherein the power generation device (1) is configured in the form of a hybrid vehicle with a traction battery (4) and the fuel cell system (2)

includes an air supply unit (5) with a compressor (6) for supplying air to a fuel cell stack (7) of the fuel cell system (2), wherein the operating strategy of the fuel cell system (2) is set in such a way that, when the automatic start/stop system of the hybrid vehicle has been activated, the fuel cell system (2), including the compressor (5), is switched off when
  it is detected during the ascertainment of the at least one current operating parameter (P1) of the hybrid vehicle that the required power in the hybrid vehicle is less than a minimum power of the fuel cell system (2), the ignition of the hybrid vehicle is on, and the state of charge of the traction battery (4), SOC, corresponds to a predefinable setpoint state.

5. The method as claimed in claim 1, wherein the power generation device (1) is configured in the form of a hybrid vehicle with a traction battery (4) and the fuel cell system (2) includes an air supply unit (5) with a compressor (6) for supplying air to a fuel cell stack (7) of the fuel cell system (2), wherein the operating strategy of the fuel cell system (2) is set in such a way that, when the automatic start/stop system of the hybrid vehicle is activated, the fuel cell system (2) is switched off, with the exception of the compressor (5), which is subsequently operated further in idling mode for a predefinable period of time, when
  it is detected during the ascertainment of the at least one current operating parameter (P1) of the hybrid vehicle that the required power in the hybrid vehicle is less than a minimum power of the fuel cell system (2), the ignition of the hybrid vehicle is on, and the state of charge of the traction battery (4), SOC, corresponds to a predefinable setpoint state.

6. The method as claimed in claim 1, wherein the power generation device (1) is configured in the form of a hybrid vehicle with a traction battery (4) and the fuel cell system (2) includes an air supply unit (5) with a compressor (6) for supplying air to a fuel cell stack (7) of the fuel cell system (2), wherein the operating strategy of the fuel cell system (2) is set in such a way that, when the automatic start/stop system of the hybrid vehicle has been activated, the fuel cell system (2) is continuously operated when
  it is detected during the ascertainment of the at least one current operating parameter (P1) of the hybrid vehicle that the required power in the hybrid vehicle is less than a minimum power of the fuel cell system (2), the ignition of the hybrid vehicle is on, and the state of charge of the traction battery (4), SOC, is less than a predefinable setpoint state.

7. The method as claimed in claim 1, wherein the power generation device (1) is configured in the form of a hybrid vehicle with a traction battery (4) and the fuel cell system (2) includes an air supply unit (5) with a compressor (6) for supplying air to a fuel cell stack (7) of the fuel cell system (2), wherein the operating strategy of the fuel cell system (2) is set in such a way that the fuel cell system (2) is continuously operated when
  it is determined during the ascertainment of the at least one current operating parameter (P1) of the hybrid vehicle that the required power in the hybrid vehicle is less than a predefinable threshold value and the ignition of the hybrid vehicle is on, at least for a predefinable period of time.

8. The method as claimed in claim 1, wherein the power generation device (1) is configured in the form of a hybrid vehicle with a traction battery (4) and the fuel cell system (2) includes an air supply unit (5) with a compressor (6) for supplying air to a fuel cell stack (7) of the fuel cell system (2), wherein the operating strategy of the fuel cell system (2) is set in such a way that the fuel cell system (2) is continuously operated and the traction battery (4) of the hybrid vehicle is charged until the state of charge, SOC, corresponds to a predefinable setpoint state when
  it is detected during the ascertainment of the at least one current operating parameter (P1) of the hybrid vehicle that the required power in the hybrid vehicle is less than a minimum power of the fuel cell system (2), the ignition of the hybrid vehicle is on, and the state of charge of the traction battery (4), SOC, is less than a predefinable setpoint state,
  wherein, thereafter, an output power of the fuel cell system (2) is reduced to a predefinable power value.

9. The method as claimed in claim 1, wherein the power generation device (1) is configured in the form of a hybrid vehicle with a traction battery (4) and the fuel cell system (2) includes an air supply unit (5) with a compressor (6) for supplying air to a fuel cell stack (7) of the fuel cell system (2), wherein the operating strategy of the fuel cell system (2) is set in such a way that the fuel cell system (2), including the compressor (5), is switched off when
  it is detected during the ascertainment of the at least one current operating parameter (P1) of the hybrid vehicle that the required requested fuel cell power is equal to zero and the hybrid vehicle has been manually switched off by the driver when
  it is detected during the ascertainment of the at least one cumulative operating parameter (P2, P3, P4) that shutdown times of the vehicle are longer than predefinable reference shutdown times.

10. The method as claimed in claim 1, wherein the power generation device (1) is configured in the form of a hybrid vehicle with a traction battery (4) and the fuel cell system (2) includes an air supply unit (5) with a compressor (6) for supplying air to a fuel cell stack (7) of the fuel cell system (2), wherein the operating strategy of the fuel cell system (2) is set in such a way that the fuel cell system (2) is switched off, except for the compressor (5), which is continued to be operated in idling mode for a predefinable period of time, when
  it is detected during the ascertainment of the at least one current operating parameter (P1) of the hybrid vehicle that the required power in the hybrid vehicle is less than a minimum power of the fuel cell system (2), the hybrid vehicle has been manually switched off by the driver, and
  it is detected during the ascertainment of the at least one cumulative and/or predictive operating parameter (P2, P3, P4) of the hybrid vehicle that a predefinable number of shutoff times of the hybrid vehicle was shorter than a setpoint time in each case over a predefinable period of time.

11. The method as claimed in claim 1, wherein the power generation device (1) is configured in the form of a hybrid vehicle with a traction battery (4) and the fuel cell system (2) includes an air supply unit (5) with a compressor (6) for supplying air to a fuel cell stack (7) of the fuel cell system (2), wherein the operating strategy of the fuel cell system (2) is set in such a way that the fuel cell system (2) is continued to be continuously operated for a predefined period of time and, thereafter, is switched off, including the compressor (5), when
  it is detected during the ascertainment of the at least one current operating parameter (P1) of the hybrid vehicle that the required power in the hybrid vehicle is less than a minimum power of the fuel cell system (2) and the hybrid vehicle has been manually switched off by the driver, and when the state of charge of the traction battery (4), SOC, is less than a predefinable setpoint state.

12. The method as claimed in claim 1, wherein the power generation device (1) is configured in the form of a hybrid vehicle with a traction battery (4) and the fuel cell system (2) includes an air supply unit (5) with a compressor (6) for supplying air to a fuel cell stack (7) of the fuel cell system (2), wherein the operating strategy of the fuel cell system (2) is set in such a way that the fuel cell system (2) is continued to be continuously operated for a predefinable period of time, in which the traction battery (4) is charged, until the state of charge of the traction battery (4) corresponds to a predefinable setpoint state and, thereafter, is switched off, with the exception of the compressor (5), which is then continued to be operated in the idling mode for a predefinable time, when it is detected during the ascertainment of the at least one current operating parameter (P1) of the hybrid vehicle that the required power in the hybrid vehicle is less than a minimum power of the fuel cell system (2) and the hybrid vehicle has been manually switched off by the driver.

\* \* \* \* \*